(12) United States Patent
Moghe et al.

(10) Patent No.: US 11,214,163 B2
(45) Date of Patent: Jan. 4, 2022

(54) COIL ASSOCIATION IN MULTISITE STATIONARY WIRELESS POWER TRANSFER (WPT) AND (QUASI-)DYNAMIC WPT DEPLOYMENTS

(71) Applicant: Cisco Technology, Inc., San Jose, CA (US)

(72) Inventors: Ashok Krishnaji Moghe, Pleasanton, CA (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 16/208,751

(22) Filed: Dec. 4, 2018

(65) Prior Publication Data
US 2020/0171969 A1    Jun. 4, 2020

(51) Int. Cl.
| | | |
|---|---|---|
| *B60L 53/00* | (2019.01) | |
| *B60L 53/60* | (2019.01) | |
| *H02J 50/80* | (2016.01) | |
| *B60L 53/12* | (2019.01) | |
| *B60L 53/30* | (2019.01) | |
| *B60L 53/66* | (2019.01) | |
| *H02J 50/00* | (2016.01) | |
| *B60L 53/34* | (2019.01) | |

(52) U.S. Cl.
CPC .............. *B60L 53/60* (2019.02); *B60L 53/12* (2019.02); *B60L 53/305* (2019.02); *B60L 53/66* (2019.02); *H02J 50/00* (2016.02); *H02J 50/80* (2016.02); *B60L 53/34* (2019.02)

(58) Field of Classification Search
CPC ........ B60L 53/60; B60L 53/66; B60L 53/305; B60L 53/12; B60L 53/34; H02J 50/00; H02J 50/80; H02J 50/90; H02J 50/12; Y02T 90/14; Y02T 90/12; Y02T 90/16; Y02T 10/7072; Y02T 10/70
See application file for complete search history.

(56) References Cited

U.S. PATENT DOCUMENTS

| | | | | |
|---|---|---|---|---|
| 4,836,344 A | * | 6/1989 | Bolger | .................... B60L 5/005 |
| | | | | 191/10 |
| 5,207,304 A | * | 5/1993 | Lechner | .................. B60L 53/12 |
| | | | | 191/10 |
| 5,573,090 A | * | 11/1996 | Ross | ....................... B60L 50/51 |
| | | | | 191/10 |

(Continued)

OTHER PUBLICATIONS

Hussain, et al., "PBF: A New Privacy-Aware Billing Framework for Online Electric Vehicles with Bidirectional Auditability", Research Article, Wireless Communications and Mobile Computing, vol. 2017, Article ID 5676030, 17 pages, 2017, hindawi.com.

(Continued)

*Primary Examiner* — Naum Levin
(74) *Attorney, Agent, or Firm* — Behmke Innovation Group LLC; Kenneth J. Heywood; Jonathon P. Western

(57) ABSTRACT

In one embodiment, a device associates a charging coil with a coil identifier. The device sends the coil identifier to a communication module of the charging coil. The communication module of the charging coil forwards the coil identifier to an electric vehicle located above the charging coil. The device receives the coil identifier from the electric vehicle. The device associates the electric vehicle with the charging coil.

10 Claims, 14 Drawing Sheets

(56) References Cited

U.S. PATENT DOCUMENTS

| | | | | |
|---|---|---|---|---|
| 5,821,728 A * | 10/1998 | Schwind | H01M 10/44 | 320/108 |
| 6,189,664 B1 * | 2/2001 | Siciliano | B60M 1/103 | 191/18 |
| 8,030,888 B2 * | 10/2011 | Pandya | B60L 11/1809 | 320/109 |
| 8,469,122 B2 * | 6/2013 | Perlman | H02J 50/10 | 180/2.1 |
| 8,712,324 B2 * | 4/2014 | Corbridge | H02J 7/025 | 455/41.1 |
| 8,884,581 B2 * | 11/2014 | Widmer | B60L 53/122 | 320/108 |
| 9,197,093 B2 * | 11/2015 | Sagata | B60L 53/126 | |
| 9,379,780 B2 * | 6/2016 | Widmer | H02J 7/0042 | |
| 9,463,706 B2 * | 10/2016 | Bell | H02J 7/025 | |
| 9,497,232 B2 | 11/2016 | Heinrich et al. | | |
| 9,511,674 B2 * | 12/2016 | Keeling | H02J 50/40 | |
| 9,630,516 B2 * | 4/2017 | Enomoto | B60L 53/126 | |
| 9,712,433 B2 * | 7/2017 | Hui | H04L 45/48 | |
| 9,722,447 B2 * | 8/2017 | Partovi | B60L 53/126 | |
| 9,834,104 B2 * | 12/2017 | Tsukamoto | B60L 58/21 | |
| 9,840,155 B2 * | 12/2017 | Tsukamoto | H02J 50/90 | |
| 9,908,426 B2 * | 3/2018 | Fukushima | B60L 53/38 | |
| 10,029,577 B2 * | 7/2018 | Widmer | B60L 53/38 | |
| 10,042,359 B1 * | 8/2018 | Konrardy | G08G 1/148 | |
| 10,090,567 B2 * | 10/2018 | Austin | B60L 53/18 | |
| 10,135,496 B2 * | 11/2018 | Long | H04B 1/30 | |
| 10,207,820 B2 * | 2/2019 | Sullivan | B64F 1/362 | |
| 10,320,923 B2 * | 6/2019 | Moghe | G08G 1/0133 | |
| 10,325,717 B2 * | 6/2019 | Boys | B60L 53/126 | |
| 10,340,078 B2 * | 7/2019 | Widmer | B60L 53/122 | |
| 10,351,008 B2 * | 7/2019 | Seong | B60L 53/38 | |
| 10,367,369 B2 * | 7/2019 | Partovi | H02J 50/80 | |
| 10,369,893 B2 * | 8/2019 | Moghe | G05D 1/0282 | |
| 10,507,737 B2 * | 12/2019 | Moghe | H02J 50/90 | |
| 10,668,828 B2 * | 6/2020 | Wang | B60L 53/12 | |
| 10,714,955 B2 * | 7/2020 | Penilla | B60L 53/305 | |
| 10,739,769 B2 * | 8/2020 | Dean | G05D 1/0214 | |
| 10,819,137 B2 * | 10/2020 | Khoche | H04L 67/12 | |
| 2008/0039979 A1 * | 2/2008 | Bridges | B60L 53/65 | 700/292 |
| 2010/0141203 A1 * | 6/2010 | Graziano | B60L 53/18 | 320/109 |
| 2011/0050164 A1 * | 3/2011 | Partovi | H02J 7/00034 | 320/108 |
| 2011/0184842 A1 * | 7/2011 | Melen | G06Q 30/04 | 705/34 |
| 2011/0221387 A1 * | 9/2011 | Steigerwald | B60L 53/38 | 320/108 |
| 2012/0217111 A1 * | 8/2012 | Boys | H01F 38/14 | 191/10 |
| 2013/0029595 A1 * | 1/2013 | Widmer | H04B 5/0031 | 455/39 |
| 2013/0154553 A1 * | 6/2013 | Steele | B60M 7/003 | 320/108 |
| 2013/0249299 A1 * | 9/2013 | Shijo | H02J 50/60 | 307/80 |
| 2013/0278076 A1 * | 10/2013 | Proud | A61B 5/0024 | 307/104 |
| 2014/0217966 A1 * | 8/2014 | Schneider | H02J 50/90 | 320/108 |
| 2014/0266004 A1 | 9/2014 | Andrews, Jr. | | |
| 2015/0246614 A1 * | 9/2015 | Dames | H01F 38/14 | 191/10 |
| 2015/0298559 A1 * | 10/2015 | Keeling | H02J 7/00304 | 320/108 |
| 2016/0075249 A1 * | 3/2016 | Grabar | B60L 53/665 | 320/108 |
| 2016/0134162 A1 * | 5/2016 | Koizumi | H02J 7/00034 | 307/9.1 |
| 2016/0243949 A1 * | 8/2016 | Merkel | H02J 50/40 | |
| 2016/0339790 A1 * | 11/2016 | Tsukamoto | H02J 50/40 | |
| 2017/0294941 A1 * | 10/2017 | Long | H02J 50/80 | |
| 2018/0056800 A1 * | 3/2018 | Meichle | B60L 53/62 | |
| 2018/0118040 A1 | 5/2018 | Kim et al. | | |
| 2018/0241255 A1 * | 8/2018 | Leabman | H02J 50/40 | |
| 2018/0356833 A1 * | 12/2018 | Ohman | B60L 5/36 | |
| 2019/0097471 A1 * | 3/2019 | Pantic | B60L 53/39 | |
| 2019/0157869 A1 * | 5/2019 | Gadh | H02J 3/381 | |
| 2019/0202415 A1 * | 7/2019 | Lai | B60L 53/305 | |
| 2019/0210479 A1 * | 7/2019 | Bachmann | G05D 1/0225 | |
| 2019/0285425 A1 * | 9/2019 | Ludwick | B60L 53/66 | |
| 2019/0381891 A1 * | 12/2019 | Moghe | B60L 53/38 | |

OTHER PUBLICATIONS

Kosmanos, et al., "Route Optimization of Electric Vehicles based on Dynamic Wireless Charging", arXiv:1710.03726v1, pp. 1-11, Oct. 9, 2017., arXiv.org.

Li, et al., "FADEC: Fast Authentication for Dynamic Electric Vehicle Charging", 2013 IEEE Conference on Communications and Network Security (CNS), National Harbor, MD., pp. 369-370, 2013, IEEE.

Mazharov, et al., "Some Problems of Dynamic Contactless Charging of Electric Vehicles", Acta Polytechnica Hungarica, https://www.uni-obuda.hu/journal/Mazharov_Hristov_Dichev_Zhelezarov_75.pdf, vol. 14, No. 4, 2017, pp. 7-26, uni-obuda.hu.

* cited by examiner

US 11,214,163 B2

COIL ASSOCIATION IN MULTISITE STATIONARY WIRELESS POWER TRANSFER (WPT) AND (QUASI-)DYNAMIC WPT DEPLOYMENTS

TECHNICAL FIELD

The present disclosure relates generally to smart transportation systems, and, more particularly, to coil association in multisite stationary wireless power transfer (WPT) and (quasi-)dynamic WPT deployments.

BACKGROUND

Electric vehicles are becoming more and more ubiquitous and provide a number of benefits over that of petroleum-fueled vehicles. First, unlike petroleum-fueled vehicles, purely electric vehicles have zero tailpipe emissions. This lack of pollution can have a considerable effect on the environment and can reduce or even eliminate certain environmental conditions, such as smog in an urban environment. Second, electric vehicles allow for a greater number of energy sources to be utilized. For example, an electric vehicle can be charged using electricity generated by any number of energy sources such as solar, nuclear, hydroelectric, and the like.

While electric vehicles have certain advantages over those of petroleum-fueled vehicles, transitioning the word's fleet to electric vehicles is not without difficult. Notably, while there are many fueling stations for petroleum-fueled vehicles, there are still a comparatively sparse number of charging stations for electric vehicles. For many parts of the country, the lack of charging station availability has hindered electric vehicle adoption. However, as the number of charging stations continues to grow, so too will the number of electric vehicles in use.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
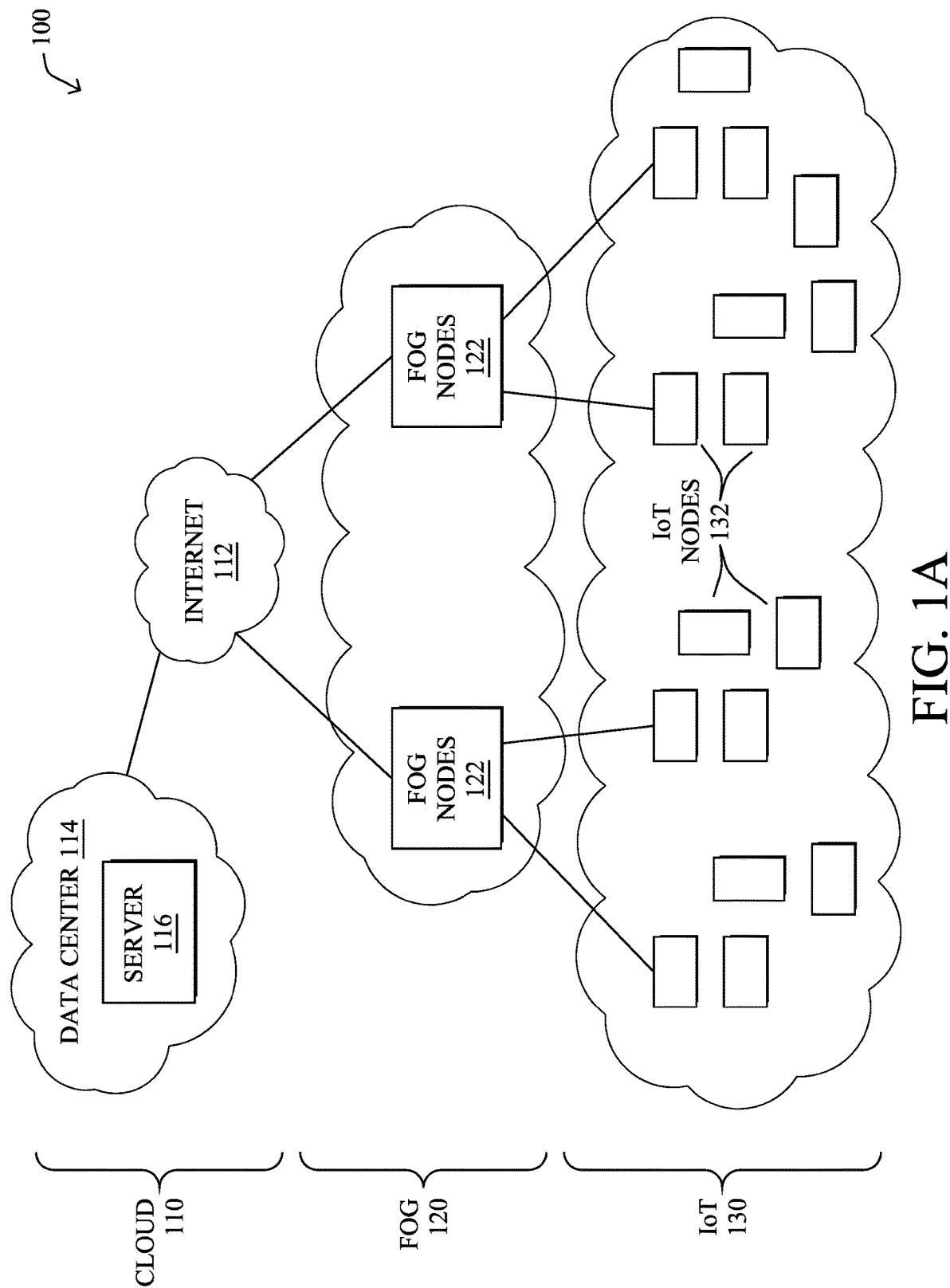
FIGS. 1A-1B illustrate an example communication network.

According to one or more embodiments of the disclosure, a device associates a charging coil with a coil identifier. The device sends the coil identifier to a communication module of the charging coil. The communication module of the charging coil forwards the coil identifier to an electric vehicle located above the charging coil. The device receives the coil identifier from the electric vehicle. The device associates the electric vehicle with the charging coil.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
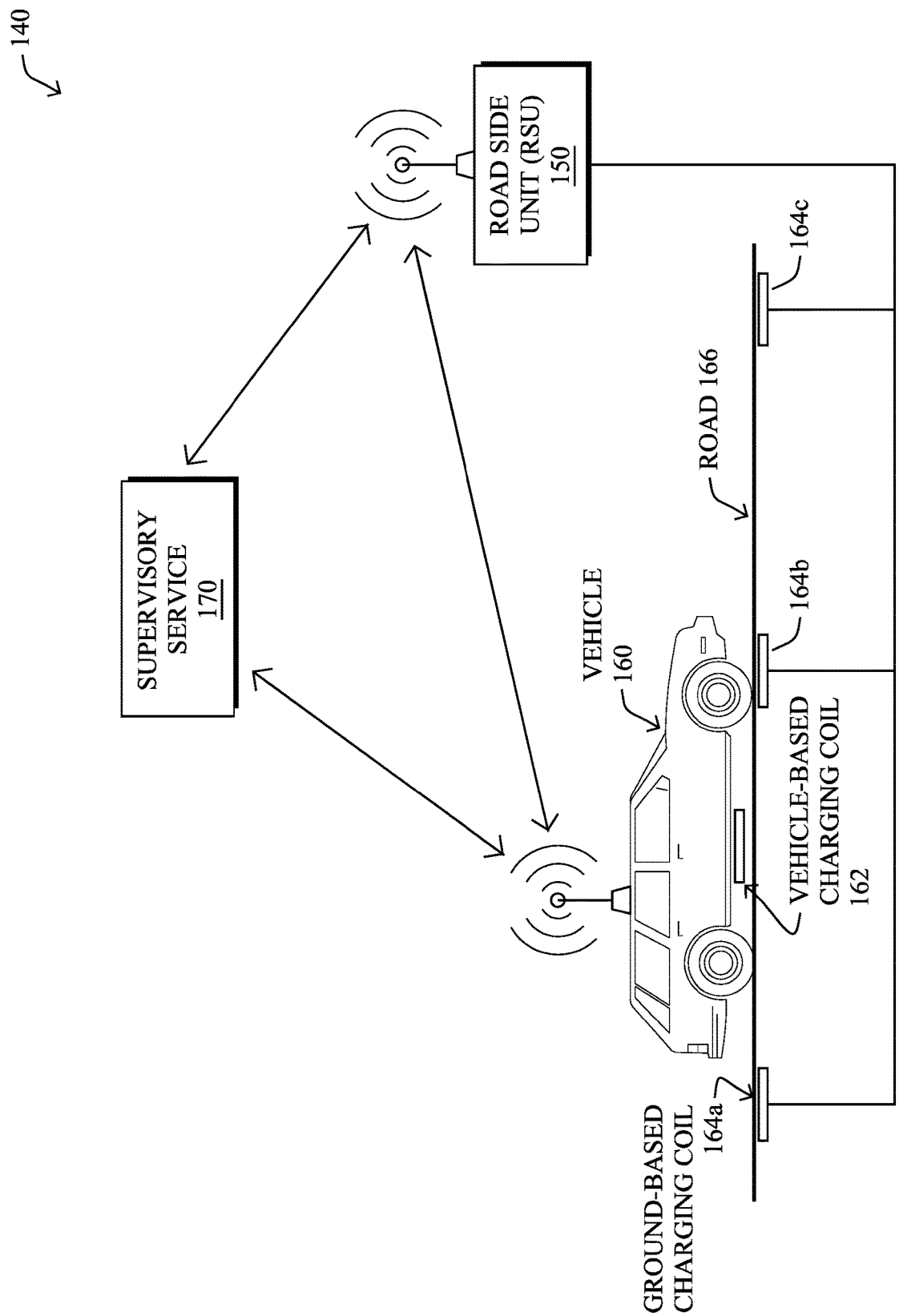

FIG. 1B illustrates an example wireless power transfer (WPT) system 140, according to various embodiments. In particular, WPT system 140 may include any or all of the following components: a vehicle 160, a roadside unit (RSU) 150, one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along road 166, such as embedded into road 166. For example, ground-based charging coils 164a-164c may be embedded into road 166 and wired to RSU 150 that provides control over the powering of ground-based charging coils 164. For purposes of clarification, the term "ground-based charging coil," generally refers to the location of the charging coil (e.g., embedded into the ground) and is not intended to imply that a coil 164 acts an electrical ground. As would be appreciated by one skilled in the art, a ground-based coil is also sometimes referred to as a "primary coil" or a "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, while ground-based charging coils 164 are shown as embedded into road 166, other implementations provide for coils 164 to be embedded into, or placed on, a parking lot, drive-thru, driveway, or any other location at which vehicle 160 may be located.

Figure 2:
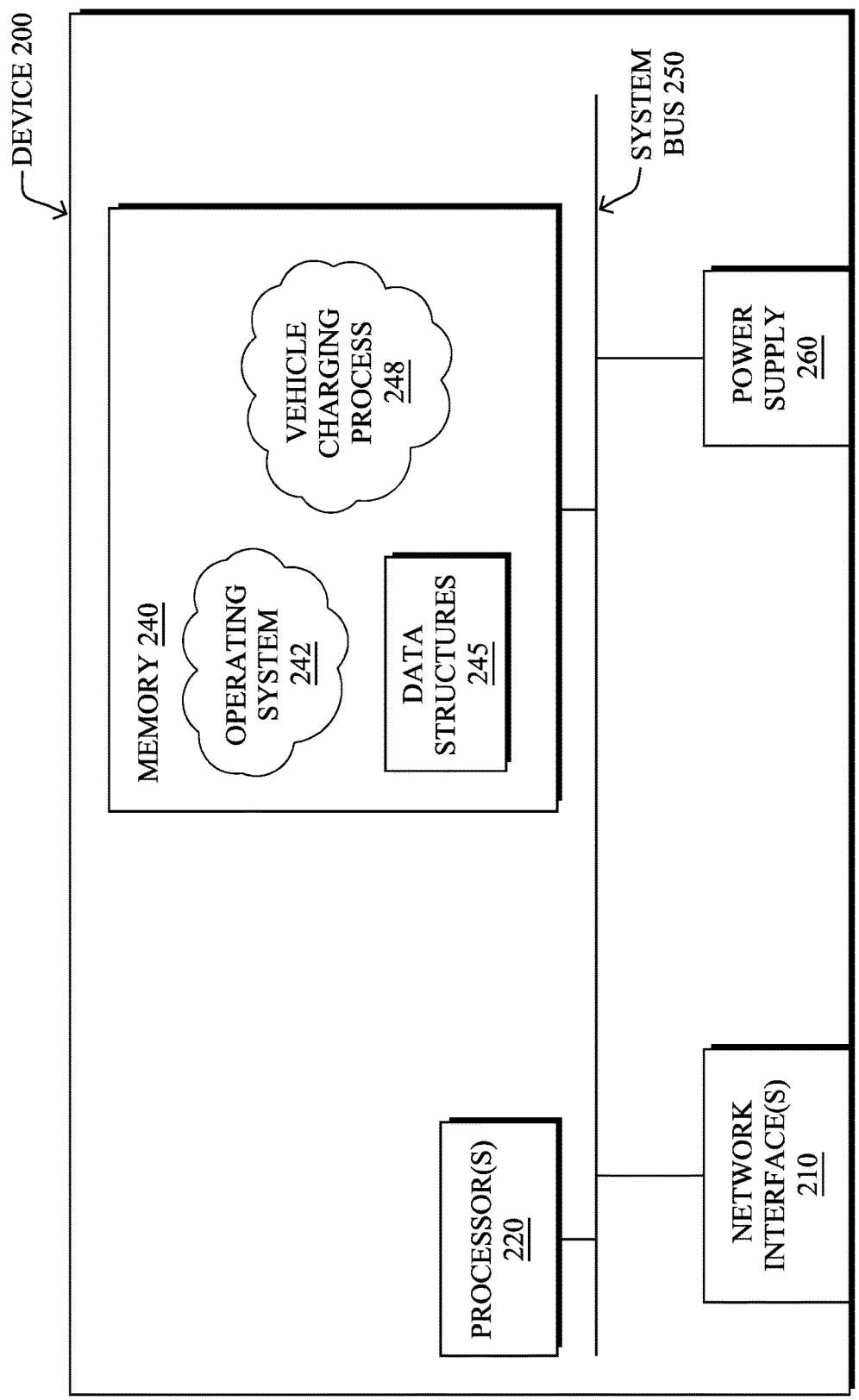
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle charging process 248, as described herein.

In general, vehicle charging process 248 may be configured to control the charging of wireless power transfer (WPT) coils for a vehicle charging system. In some embodiments, vehicle charging process 248 may do so by leveraging machine learning, to learn and adapt to the various characteristics of the vehicle and/or the ground-based charging coils. In general, machine learning is concerned with the design and the development of techniques that take as input empirical data (such as the charging history of the vehicle, the charging profile of the vehicle, the provided charge of the coil, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, vehicle charging process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that vehicle charging process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

FIGS. 3A-3D illustrate an example 300 of powering a ground-based charging coil for an upcoming vehicle, according to various embodiments. Continuing the example of FIG. 1B, assume in FIG. 3A that vehicle 160 is in communication with supervisory service 170 and/or RSU 150. During operation, vehicle 160 may send data regarding the vehicle characteristics to service 170 and/or RSU 150 for further processing. Example vehicle characteristics 302 may generally be divided into two categories: 1.) vehicle characteristics that can be used to control which ground-based charging coil(s) 164 are to be powered, as well as a time at which the coil should be powered, and 2.) characteristics that can be used to control the amount of powering the ground-based charging coil(s) 164.

Example vehicle characteristics 302 that can be used to identify a particular ground-based charging coil to be charged may be indicative of, but not limited to, any or all of the following:

A location of vehicle 160—for example, this information can include a Global Positioning System (GPS) coordinate from vehicle 160, navigation information from a subsystem of vehicle 160 (e.g., a vehicle navigation system), a signal that can be used to triangulate the location of vehicle 160, etc.

A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time.

Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time.

Examples of vehicle characteristics 302 that can be used to determine an appropriate level of powering for the ground-based charging coil 164 may be indicative of, but not limited to, any or all of the following:

Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).

Age of vehicle 160—As noted above, battery life and charging capabilities of a vehicle can change over time. This information can be used to predict how much of a change is expected from that of the factory configuration. For example, this information may comprise the year in which vehicle 160 was made.

Battery specifications of vehicle 160—if the battery cannot be identified, such as when the make/model of vehicle 160 is not available, vehicle 160 can nonetheless provide the specifications of its battery as part of vehicle characteristics 302, in some cases.

Maintenance history of vehicle 160—For example, if the battery of vehicle 160 was replaced at some point in time, this information can be pertinent to determining the appropriate charging parameters for vehicle 160.

Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, or the like.

Authentication information from vehicle 160—in the case where WPT charging is restricted, provided on a controlled basis (e.g., only to residents, only on a paid basis, etc.), or the like, this information can also be included in vehicle characteristics 302.

Figure 3A:
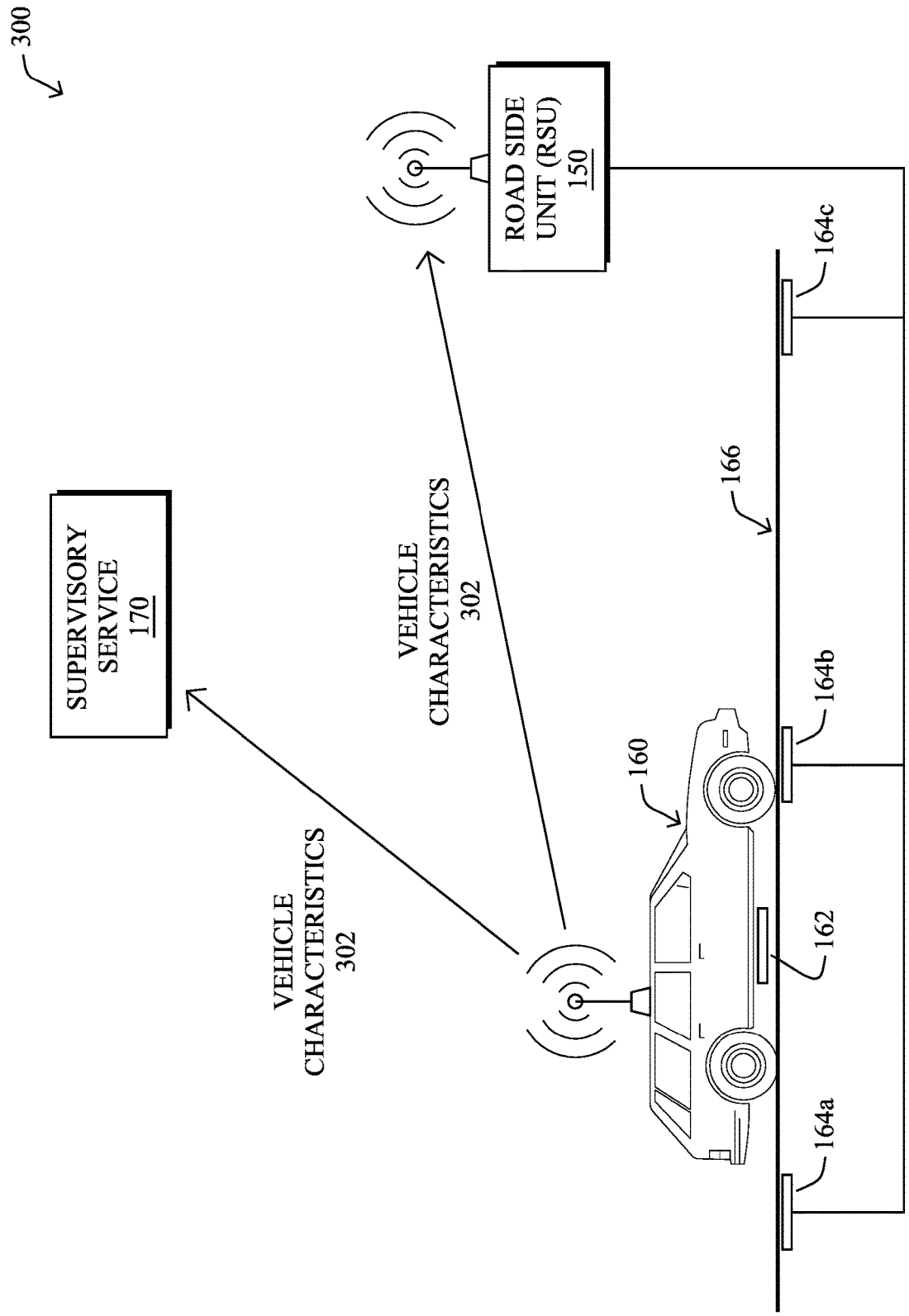
FIGS. 3A-3D illustrate an example of powering a ground-based charging coil for an upcoming vehicle.
Figure 3B:
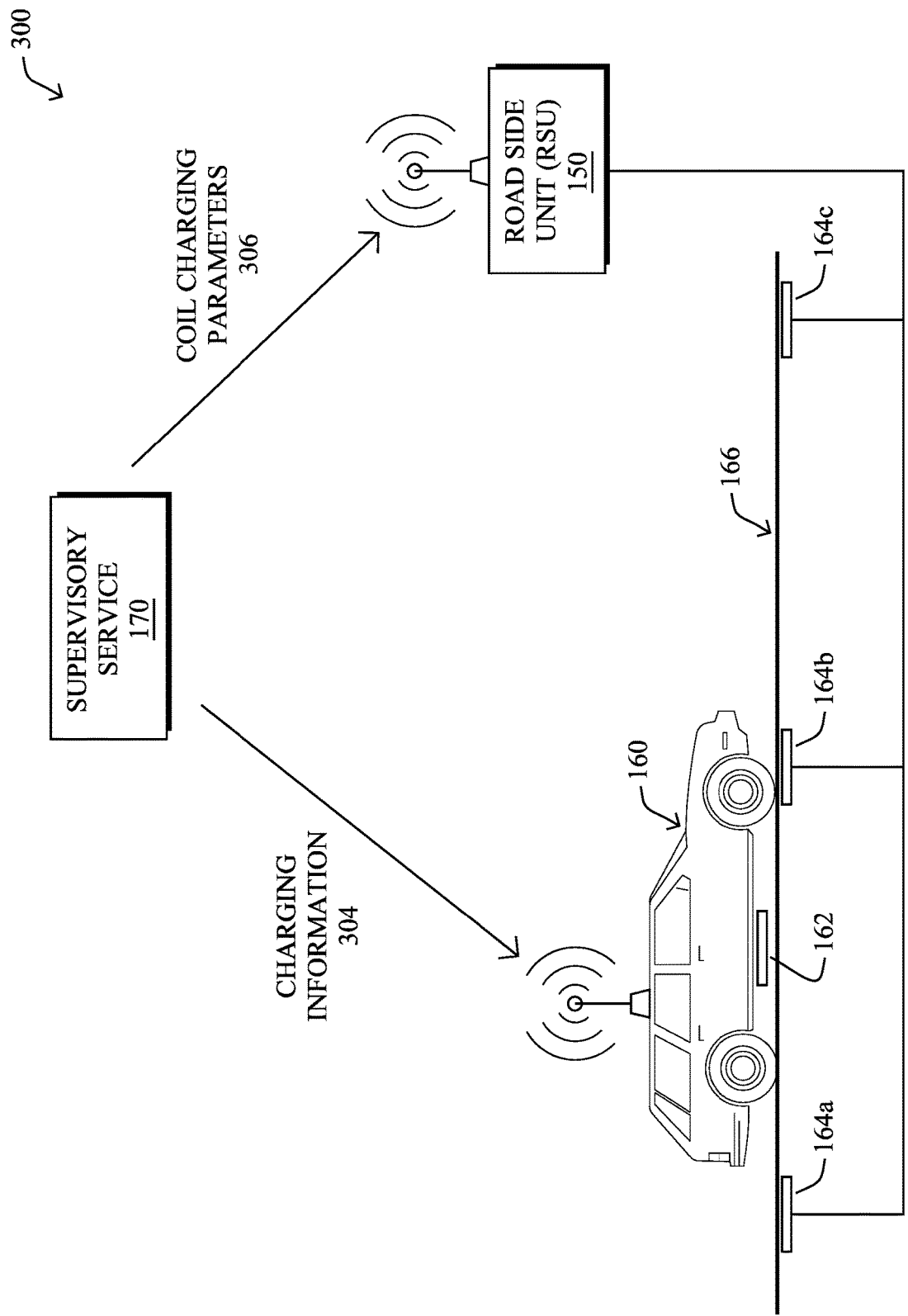

In FIG. 3B, supervisory service 170 may use the received vehicle characteristics 302, to determine the appropriate coil charging parameters 306 for ground-based charging coils 164. Generally, coil charging parameters 306 may indicate which of is ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet) with that of ground-based charging coil 164b at a time t=t₁. In addition, supervisory service 170 may determine that vehicle 160 requires charging, is authorized to charge, and/or an amount of power that should be delivered to the identified ground-based charging coil 164b. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, or the like.

Figure 3C:
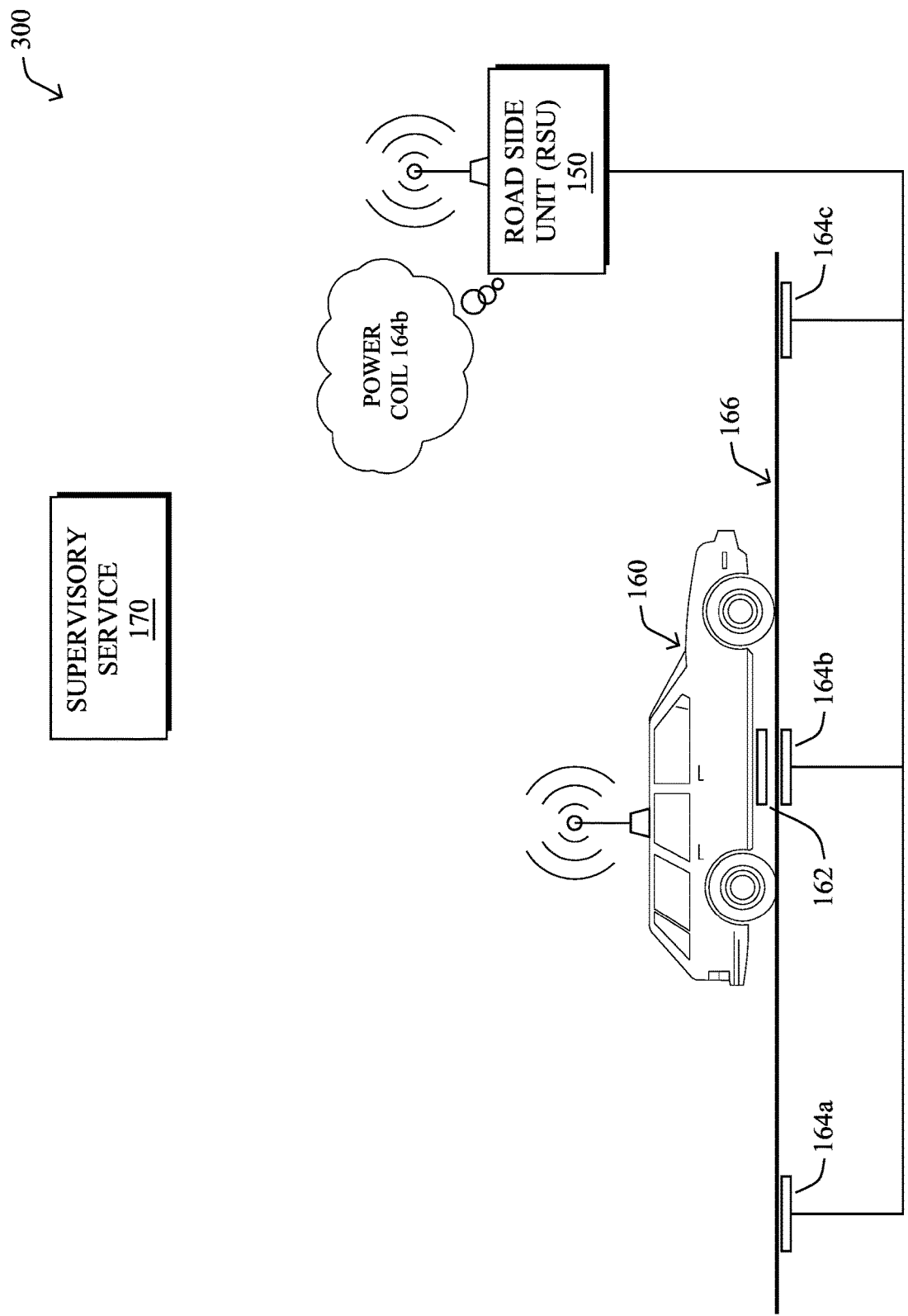

In FIG. 3C, RSU 150 may provide power to ground-based charging coil 164b, based on coil charging parameters 306. For example, RSU 150 may cause ground-based charging coil 164b to be powered to a certain power level, in advance of vehicle 160 arriving at ground-based charging coil 164b. Thus, when vehicle-based charging coil 162 is within charging proximity of ground-based charging coil 164b, the two coils may inductively couple with one another, thereby transferring power to vehicle 160 that can be used to charge the battery of vehicle 160.

Figure 3D:
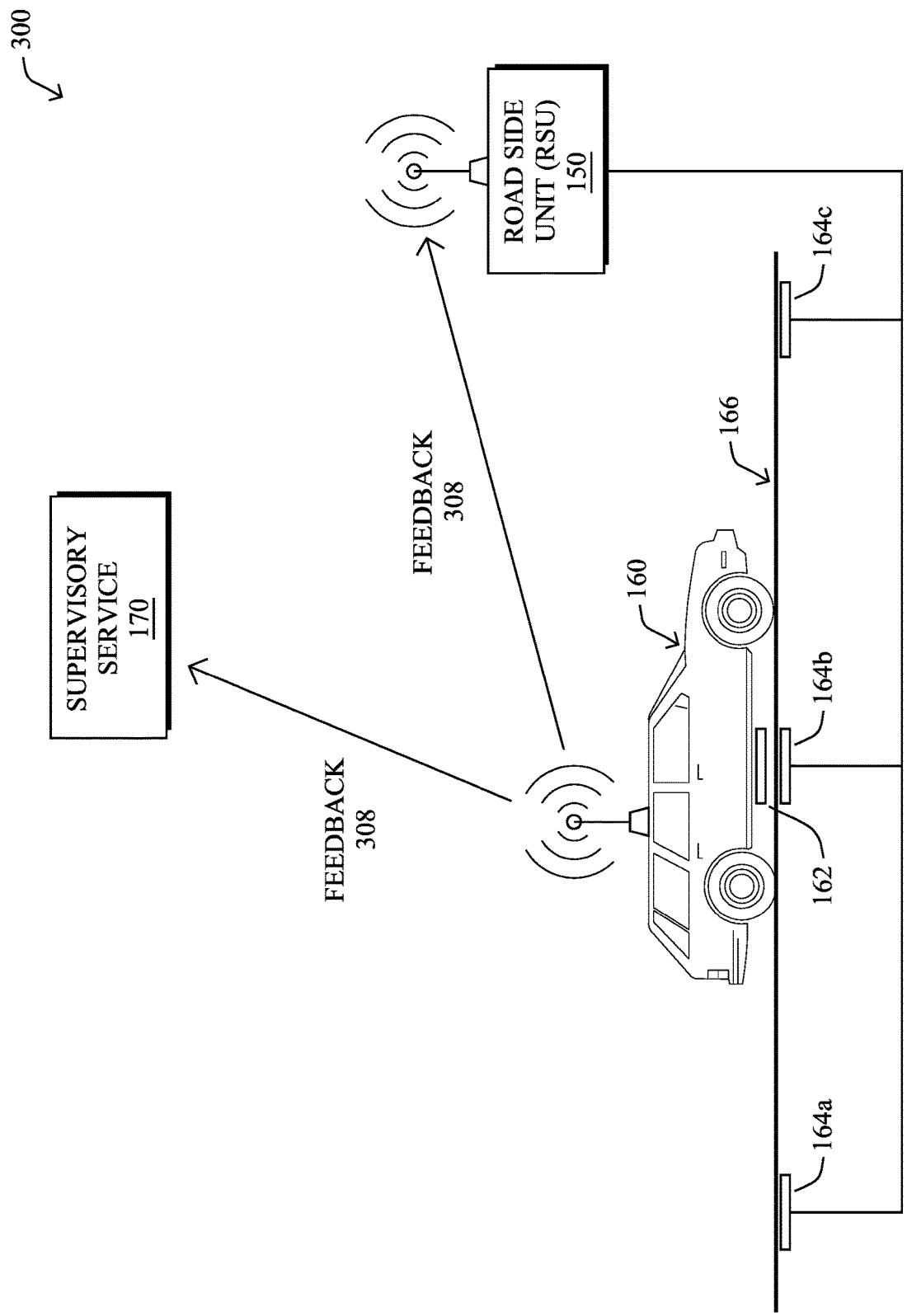

In FIG. 3D, vehicle 160 may also provide feedback 308 to supervisory service 170, and/or to RSU 150, regarding the charging from ground-based charging coil 164b. For example, feedback 308 may be indicative of the amount of charge that vehicle 160 was able to obtain from ground-based charging coil 164b, timing information in terms of the power transfer, or any other information regarding the charging operation.

As noted above, wireless power transfer (WPT) is an emerging technology that has proven to be effective for charging electric vehicles. In a typical WPT deployment for electric vehicles, a ground-based coil is supplied power, thereby inducing a current remotely in a second, vehicle-based coil located at the bottom of the vehicle. In many cases, powering of the ground-based coil by the WPT deployment will be a function of the profile associated with the vehicle. This is particularly true in cases where the owner or driver of the vehicle is charged for the service. Accordingly, it is critical that a WPT deployment correctly associate a given ground-based charging coil with the actual vehicle receiving charge from the coil.

Typically, the association between a ground-based charging coil and a vehicle is achieved through any or all of the following:

User Designation—for example, a driver may use an application or kiosk of the WPT system, to identify the location of his or her vehicle.

Onboard Vehicle Reporting—for example, the vehicle may report GPS or other location data to the WPT system, which then correlates the location of the vehicle with the location of a ground-based charging coil.

External Sensors—for example, a camera, license plate reader, or the like, may detect the location of the vehicle for association with a particular charging coil.

Figure 4A:
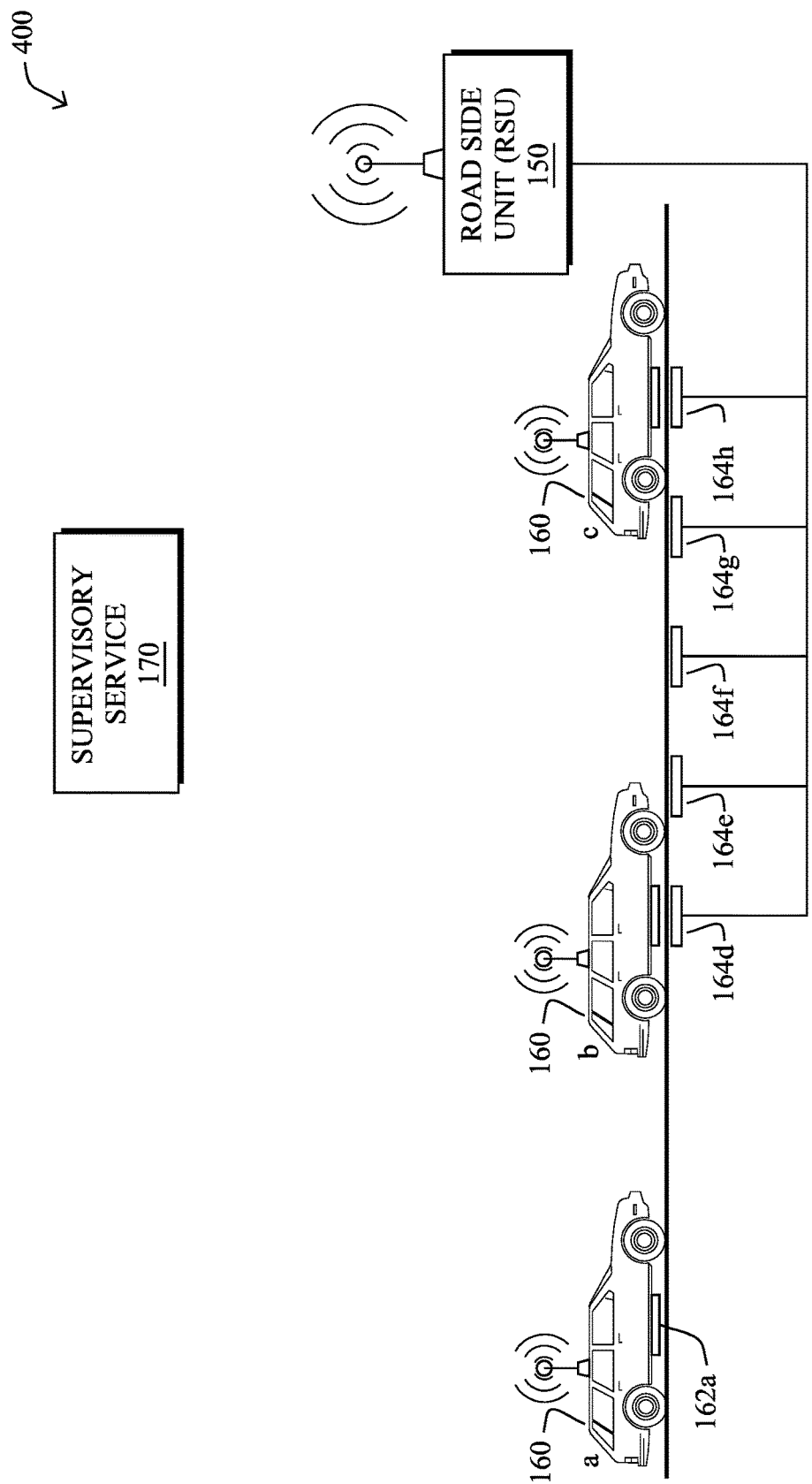
FIGS. 4A-4B illustrate examples of quasi-dynamic and stationary charging WPT deployments.
Figure 4B:
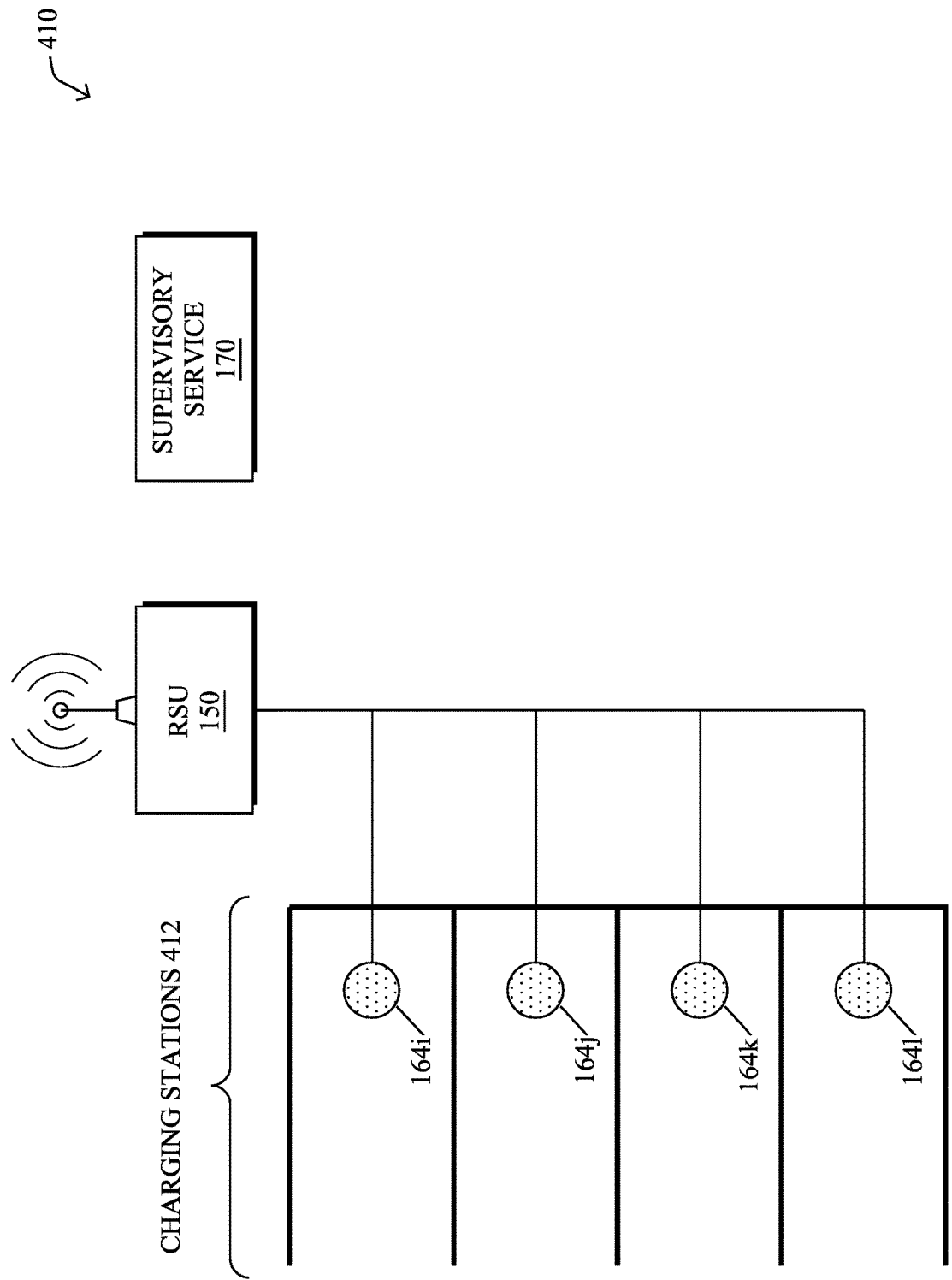

However, the above approaches can also lead to erroneously associating a ground-based charging coil with the wrong vehicle, in the stationary, dynamic, and quasi-dynamic cases. FIGS. 4A-4B illustrate examples of quasi-dynamic and stationary charging WPT deployments.

FIG. 4A illustrates an example quasi-dynamic charging WPT deployment 400. In general, quasi-dynamic WPT deployments may provide charging to vehicles that are quasi-in-motion, such as drive-thrus (e.g., at fast food pick-ups, bank ATMs, pharmacies, etc.). Similar to the dynamic case in FIGS. 3A-3D, there may be any number of ground-based charging coils embedded into the ground on which the vehicles travel, such as coils 164d-164h shown. Also similar to the dynamic case above, an RSU 150 may provide control over coils 164d-164h, which may be supervised by a supervisory service 170. Note that while RSU 150 is typically referred to as a "road side" unit, such a device is not limited to public roadway deployments and can be located on or near other locations, such as parking lots, parking garages, drive-thrus, and the like.

In various embodiments, and especially for such in-lane quasi-in-motion charging, the WPT deployment may include multiple, smaller ground-based coils 164, as opposed to a few large, optimized single-coils, which are typically used for stationary parking-type wireless charging. This granularity provides several benefits:

Since vehicles (e.g., vehicles 160a-160c shown) are typically moving slowly along quasi-dynamic WPT deployments, deploying smaller ground-based coils 164 allows supervisory service 170 and/or RSU 150 to select the set of coils 164 for optimal power transfer to vehicles 160a-160c, as opposed to a single coil transferring power inefficiently because of a large misalignment.

Smaller coils with finer granularity also accommodate vehicles 160 of varying sizes, as their vehicle-based charging coils 162 also be of varying sizes.

However, on the other hand, this coil granularity also implies that identifying the correct set of coils is even more important. Furthermore, when the quasi-dynamic WPT deployment includes a curved pathway, as is typical in a drive-thru, correctly identifying the correct coil-vehicle pair can be challenging.

FIG. 4B illustrates an example of a stationary charging WPT deployment 410. As shown, there may be any number of charging stations 412, which may typically take the form of parking spots in a parking lot or garage. At each of charging stations 412 may be at least one ground-based charging coil, such as coils 164i-164l shown, which may be controlled by an RSU 150 or other multi-coil controller. Similar to the other deployments above, a supervisory service 170 may also oversee the operations of RSU 150 and the charging of electric vehicles via charging stations 412.

In general, ground-based charging coils 164i-164l may be of relatively larger size than those found in the quasi-dynamic charging WPT deployment 400 in FIG. 4A. However, the challenge of associating a particular vehicle with a particular ground-based coil 164 remains. Notably, many stationary charging WPT deployments place a plurality of charging stations adjacent to one another (e.g., as a block of parking spots), again leading to the potential to misidentify which vehicle is associated with which charging coil 164. Such errors can be attributed to user error (e.g., misidentification of his or her charging station via an app or kiosk, poor alignment of the vehicle within the lines of a charging station/parking spot, etc.) and/or a lack of precision of sensors (e.g., a camera may be blocked, GPS data may not be precise enough to distinguish parking spots, etc.). In further cases, such as when a vehicle is fully autonomous or semi-autonomous, the vehicle may navigate itself into a specific charging spot, hence the WPT deployment will need to precisely identify the association between the vehicle and that charging spot, automatically.

Thus, as in the dynamic charging and quasi-dynamic charging cases, it is important for the infrastructure to associate the appropriate ground-based charging coil(s) with the corresponding vehicle(s) in a precise manner that is fully autonomous without user intervention. In addition, the coil-vehicle association mechanism should also be quick enough to make the associations so that the proper ground-based coils can be energized as the vehicles move over the coils.

The other very important considerations are the authentication and billing aspects of the WPT deployment. Not only is the basic association of primary and secondary coils important, but it is also important to correctly resolve the proper account or profile of the vehicle or user, so that the charging system can bill the account for the energy delivered by the infrastructure. Otherwise, one vehicle may be incorrectly identified from a billing perspective, leading to the wrong person being billed for the charging of another's vehicle.

Coil Association in Multisite Stationary WPT and (Quasi-)Dynamic WPT Deployments The techniques introduced herein allow for the proper association of primary/ground-based charging coils with their correct vehicles in WPT deployments. Such techniques may be particularly beneficial in stationary and (quasi-) dynamic deployments with multiple adjacent primary charging coils.

Specifically, according to one or more embodiments of the disclosure as described in detail below, a device associates a charging coil with a coil identifier. The device sends the coil identifier to a communication module of the charging coil. The communication module of the charging coil forwards the coil identifier to an electric vehicle located above the charging coil. The device receives the coil identifier from the electric vehicle. The device associates the electric vehicle with the charging coil.

Illustratively, the techniques described herein may be performed by hardware, software, and/or firmware, such as in accordance with the vehicle charging process 248, which may include computer executable instructions executed by the processor 220 (or independent processor of interfaces 210) to perform functions relating to the techniques described herein.

Figure 5:
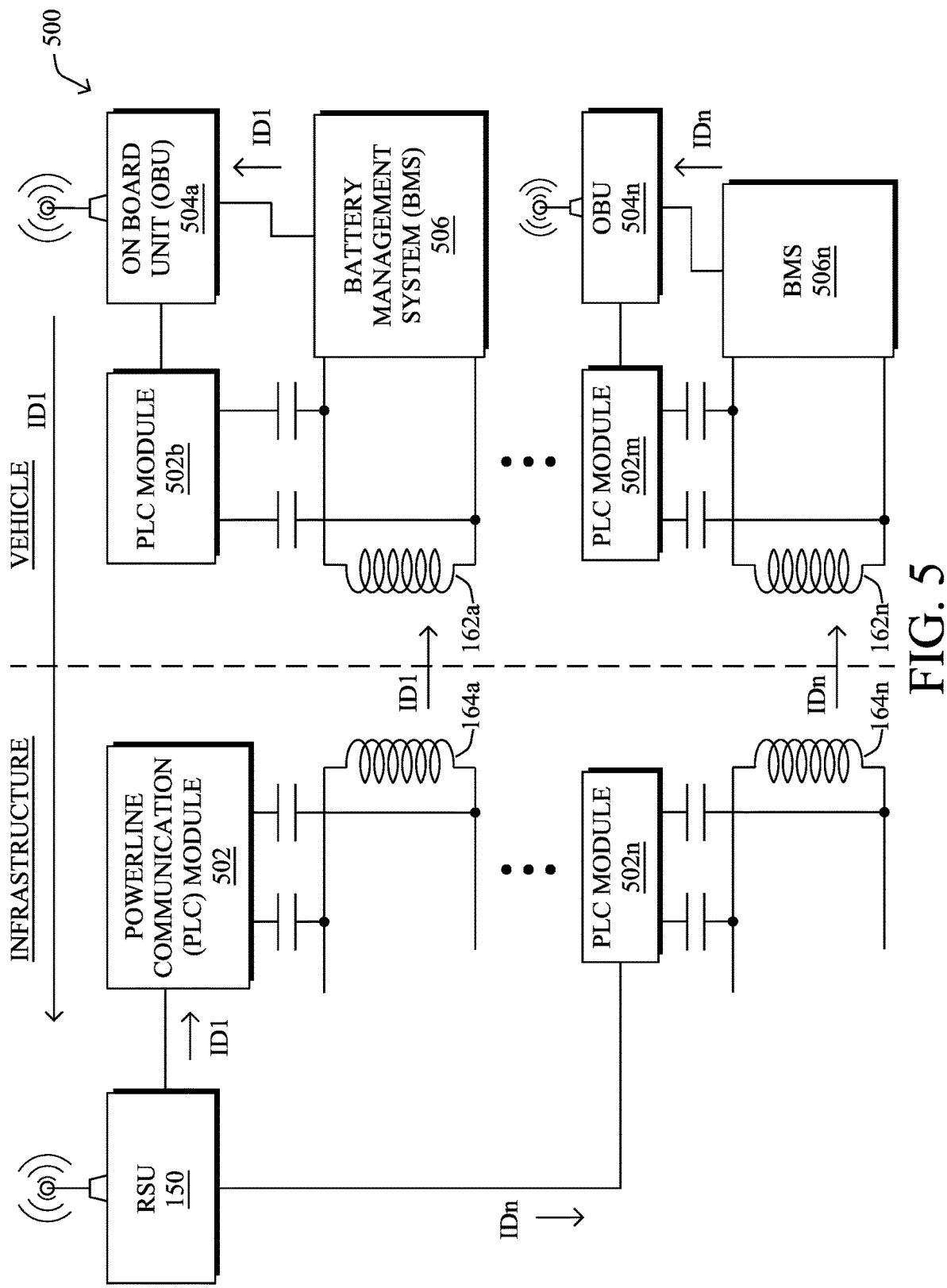
FIG. 5 illustrates an example architecture for associating a particular charging coil with a particular vehicle.

Operationally, FIG. 5 illustrates an example architecture 500 for associating a particular charging coil with a particular vehicle, according to various embodiments. As shown, assume that, on the infrastructure side, there are any number of a plurality of primary/ground-based charging coils 164 (e.g., a first through nth coil) controlled by an RSU 150 or other multi-coil controller. On the vehicle side, there may also be up to n-number of vehicles, with each vehicle including any or all of the following components: a vehicle-based charging coil 162, a battery management system (BMS) 506, and an on board unit (OBU) 504.

As noted above, a BMS 506 may be responsible for the various monitoring and charging functions associated with the battery or batteries of the vehicle (not shown). For example, a BMS 506 may monitor the amount of charge available in the battery of the vehicle. In addition, the BMS 506 of the vehicle may be coupled to the charging coil 162 of the vehicle, to regulate the charging of the battery using the power received via the coupling of coil 162 to a ground-based charging coil 164.

OBU 504 of a vehicle may be coupled to BMS 506 and configured to communicate with RSU 150, preferably in a wireless manner. For example, OBU 504 may relay the battery measurements obtained by BMS 506 to RSU 150, to indicate whether the vehicle requires charging, as well as other information that RSU 150 may use to control the charging process (e.g., by adjusting the alignment of coils 162-164, the amount of power provided to the ground-based charging coil 164, etc.).

According to various embodiments, each primary coil 164 and each secondary coil 162 may be equipped with a powerline communication (PLC) module 502. When coils 162 and 164 are electronically coupled to provide charge to the electric vehicle, the corresponding PCM modules 502 are able to communicate with each other by piggybacking the electrical current transferred to the vehicle.

To associate a particular vehicle with a particular ground-based charging coil 164, architecture 500 may operate as follows:

1. At the beginning of any new session when RSU 150 or other multi-coil controller wants to identify an association between one of its coils 164 and a particular vehicle, it may send a unique coil ID to the infrastructure-side PLC module 502 of the coil 164.
2. The infrastructure-based PLC module 502 then forwards the coil ID to its counterpart vehicle-based PLC modules 502 via their coupled coils 162-164.
3. The coil ID is then received by the corresponding secondary side PLC modules 502.
4. In turn, the vehicle-side PLC module 502 forwards the received ID to the OBU 504 of its electric vehicle.
5. Finally, the OBUs 504 communicates this unique ID back to RSU 150, such as part of its connection establishment.

Thus, by using the above approach, it will be easy for RSU 150 to associate a primary charging coil 164 with a particular electric vehicle, by matching the ID received from the OBU 504 of the vehicle to primary coil 164 to which RSU 150 sent the ID.

For stationary charging, the identifier exchange may only need to be performed during the initial communication phase. Once the WPT system establishes the association of a particular primary coil with the corresponding electric vehicle, the identifier does not need to be transmitted continuously. Of course, the techniques herein are not limited as such and the identifier exchange can be repeated any number of times in stationary charging deployments, as desired.

In the case of quasi-dynamic and dynamic charging WPT deployments, the infrastructure may periodically perform the coil identifier exchange, to track the corresponding changes in coil-vehicle associations. One way to achieve this could entail sending a continuous transmission of the identifier at a periodic rate. The OBU of the vehicle can keep communicating this identifier to the RSU, as governed by the periodic rate. Thus, whenever the association of the secondary coil changes, the RSU will know the new association. Also, in the cases of quasi-dynamic and dynamic charging based on the movement, the RSU infrastructure may also predict and track the coil associations as the vehicles move in the queue (e.g., using a machine learning-based model, as detailed above).

Beyond simply associating a vehicle with a particular ground-based coil, another equally important task relates to identifying the proper profile of a user, for purposes of authentication and billing. Notably, even if a vehicle is associated with a particular charging coil, the charging parameters for the charging process may vary, such as how billing is to take place for the charging.

Figure 6A:
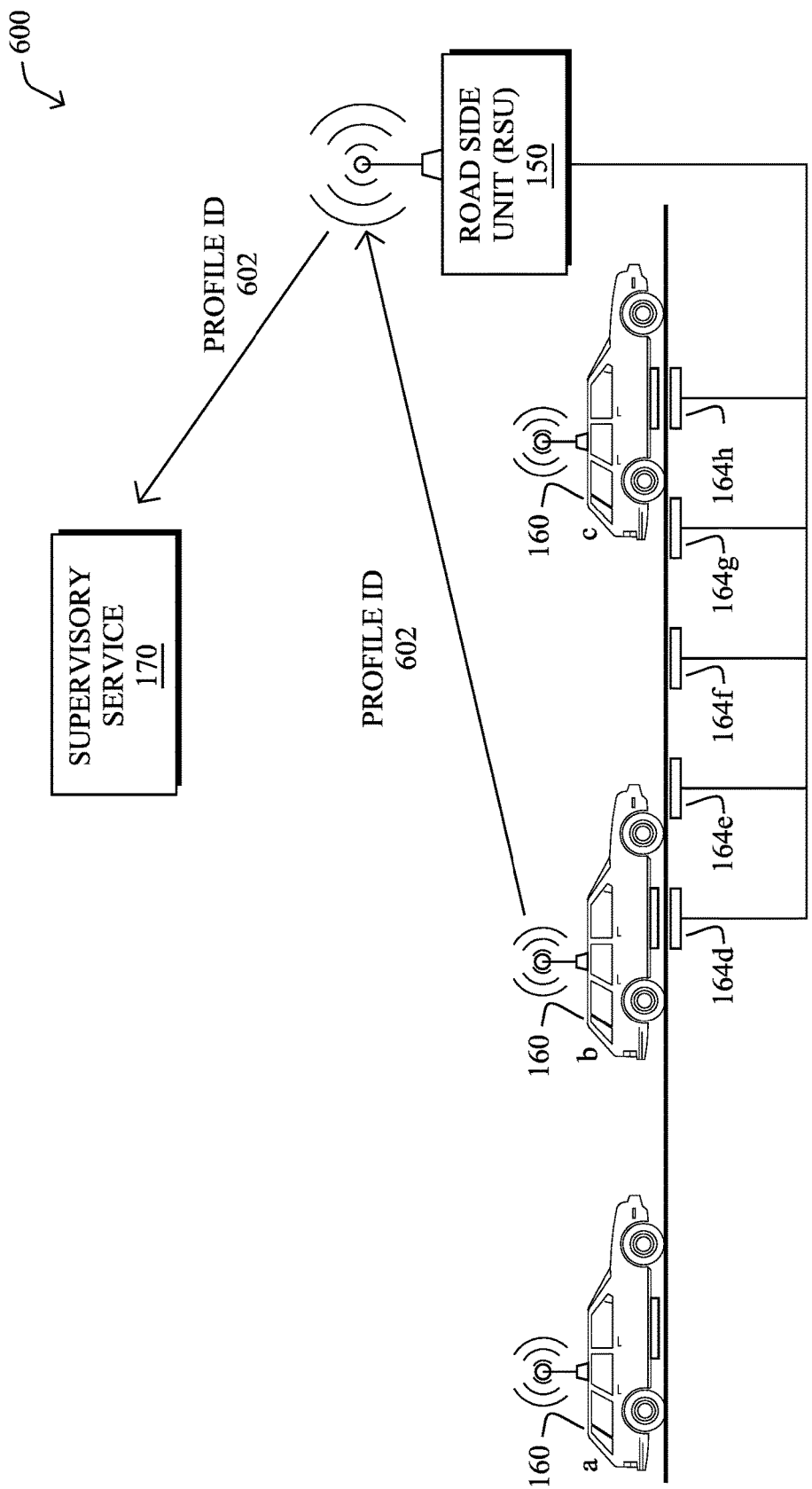
FIGS. 6A-6B illustrate examples of retrieving charging parameters for a vehicle.
Figure 6B:
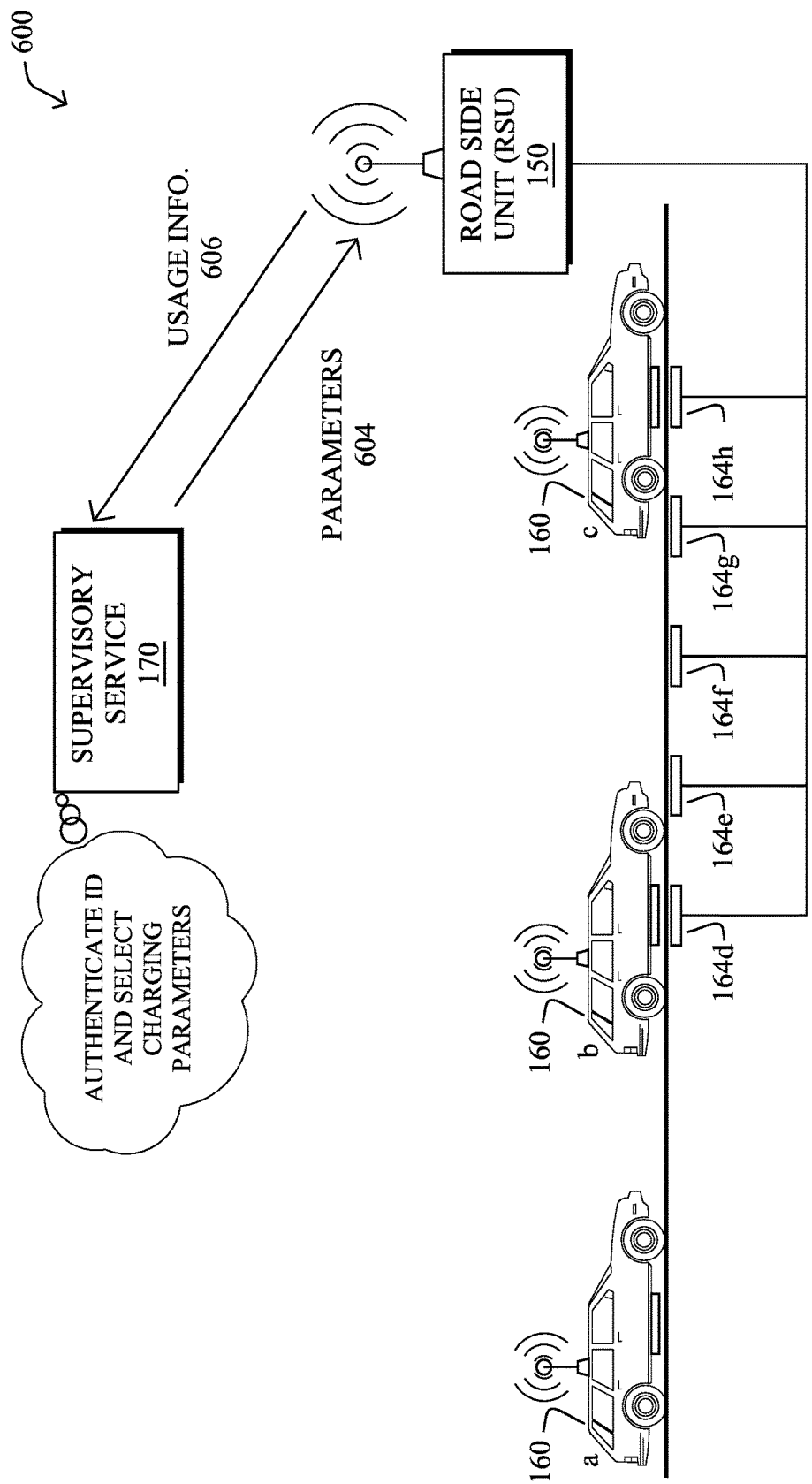

FIGS. 6A-6B illustrate examples of retrieving charging parameters for a vehicle, according to various embodiments. For illustrative purposes, example 600 in FIG. 6A continues the example of quasi-dynamic charging WPT deployment 400 from FIG. 4A in which electric vehicles 160a-160c receive charging via ground-based coils 164d-164h. To initiate charging by any given coil 164, or by a selected set of coils 164, a vehicle 160 may send a profile identifier 602 to RSU 150, and potentially in conjunction with the coil identifier exchange described previously with respect to FIG. 5. As would be appreciated, the techniques described with respect to FIGS. 6A-6B can equally be applied to the stationary and dynamic charging cases, as well.

In various cases, profile identifier 602 may include any or all of the following information:
- Vehicle Identification Information—e.g., a license plate number, a VIN number, etc.
- User/Owner Identification Information—e.g., a business name, an address, etc.
- Driver Identification Information—the name or address of the actual driver of vehicle 160b, etc.

Note also that there may be multiple profiles associated with the user, vehicle, and/or driver. For example, there may be various vehicle charging agreements with the car maker of vehicle 160b, loyalty programs from different businesses that offer WPT charging (e.g., Starbucks or Target may have prepaid or pre-signed incentives for their customers), utility company incentives/accounts, and so on. Accordingly, profile identifier 602 may also take the form of any or all of the following:
- an email/auth address
- a phone number
- an account number
- credit card information
- vehicle ID
- a license plate recognition captured by the infrastructure.

It should be noted that multiple profiles and identifications may exist simultaneously at a given time and, as shown, RSU 150 may communicate with supervisory service 170 to resolve the preferred profile to use for purposes of charging the vehicle 160. In some embodiments, supervisory service 170 may do so by associating different costs with different profiles and service 170 may select the profile with the lowest cost function. In turn, supervisory service 170 may send charging parameters 604 to RSU 150 (e.g., to authorize charging of vehicle 160b) and, in some cases, receive feedback from RSU 150 in the form of usage information 606 (e.g., how much power was consumed while charging vehicle 160b).

As an example of multiple profiles available for a given vehicle 160, different businesses may offer dynamic WPT pricing, to lure customers to their businesses. Indeed, a fast food restaurant may offer a reduced WPT charging cost for quasi-dynamic charging to customers that purchase coffee via the drive-thru during less busy hours. Another example of dynamic pricing could be a utility company offering a lower rate to its customers during periods of excess energy generation from sources like solar and wind, which might be more favorable at times.

Also note that the selection of a profile by supervisory service 170 can change from customer to customer and dynamically as the vehicles move. Accordingly, the WPT deployment will need to communicate and resolve the best suited profiles and track this within the charging infrastructure as vehicles 160 move.

In various embodiments, the overall process flow may proceed as follows:

1. RSU 150 receives an indication of the preferred profile from the OBU of vehicle 160b (e.g., in the form of profile identifier 602). The preferred profile may be determined by the vehicle, by the driver, or by sending the profiles to RSU 150 or to service 170 which would then decide. In general, it is better if the vehicle or driver decides, as then only a single profile is shared and the others are held private.

2. Supervisory service 170 checks and authenticates the profile associated with the account.
3. Supervisory service 170 then tries to select the most appropriate account/profile based on preselected preferences. Optionally, the user may be prompted to select the account/profile.
4. Based on the selection of the user profile, supervisory service 170 will then select the most appropriate billing profile to use, based on multiple factors like user preferences, cost optimization, or any other factor optimization (like loyalty programs, etc.) preferences.
5. Supervisory service 170 will then send a token to RSU 150 (e.g., as part of charging parameters 604) for identifying further transactions associated with this particular selection.
6. When RSU 150 is collecting energy usage information regarding coils 164*d*-164*h*, it may use tokens obtained in step 5 above to inform supervisory service 170 of the correct energy usage for the vehicle (e.g., as part of usage information 606).
7. Finally, supervisory service 170 may calculate the real usage costs for purposes of billing, accordingly.

Figure 7:
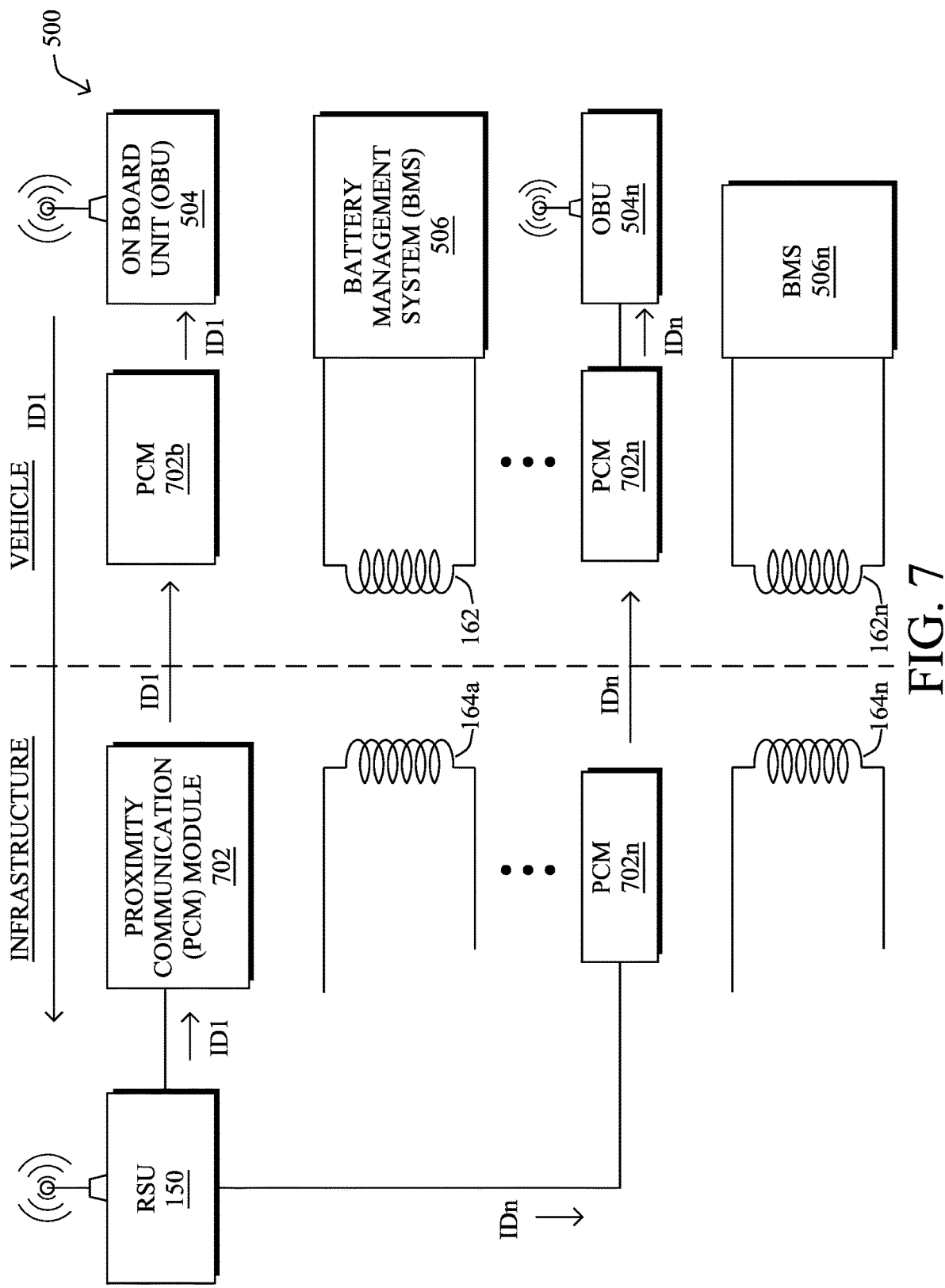
FIG. 7 illustrates another example architecture for associating a particular charging coil with a particular vehicle.

FIG. 7 illustrates another example architecture 700 for associating a particular charging coil with a particular vehicle, in further embodiments. In general, architecture 700 may include many of the same components as that of architecture 500 in FIG. 5. For example, RSU 150 may provide control over n-number of ground-based charging coils 164. On the vehicle side, each vehicle may include a secondary/vehicle-based coil 162 connected to a BMS 506 and an OBU 504 that communicates with RSU 150.

In various embodiments, rather than each coil 162-164 being equipped with a PLC module, they may instead be coupled to proximity communication modules (PCMs) 702 that use near field communications for purposes of communicating. For example, PCMs 702 may communicate using visible light, infrared (IR) communications, and/or ultrasonic communications. Accordingly, the coil-vehicle association process described with respect to FIG. 5 may take a similar form in architecture 700, with RSU 150 sending coil identifiers to the infrastructure-based PCMs 702. In turn, these PCMs 702 forward the identifiers to the PCMs 702 of the vehicles located above their corresponding ground-based charging coils 164 using their near-field communications. In doing so, the vehicles can respond back to RSU 150 with the identifiers, to associate specific ground-based charging coils 164 with specific vehicles.

Figure 8:
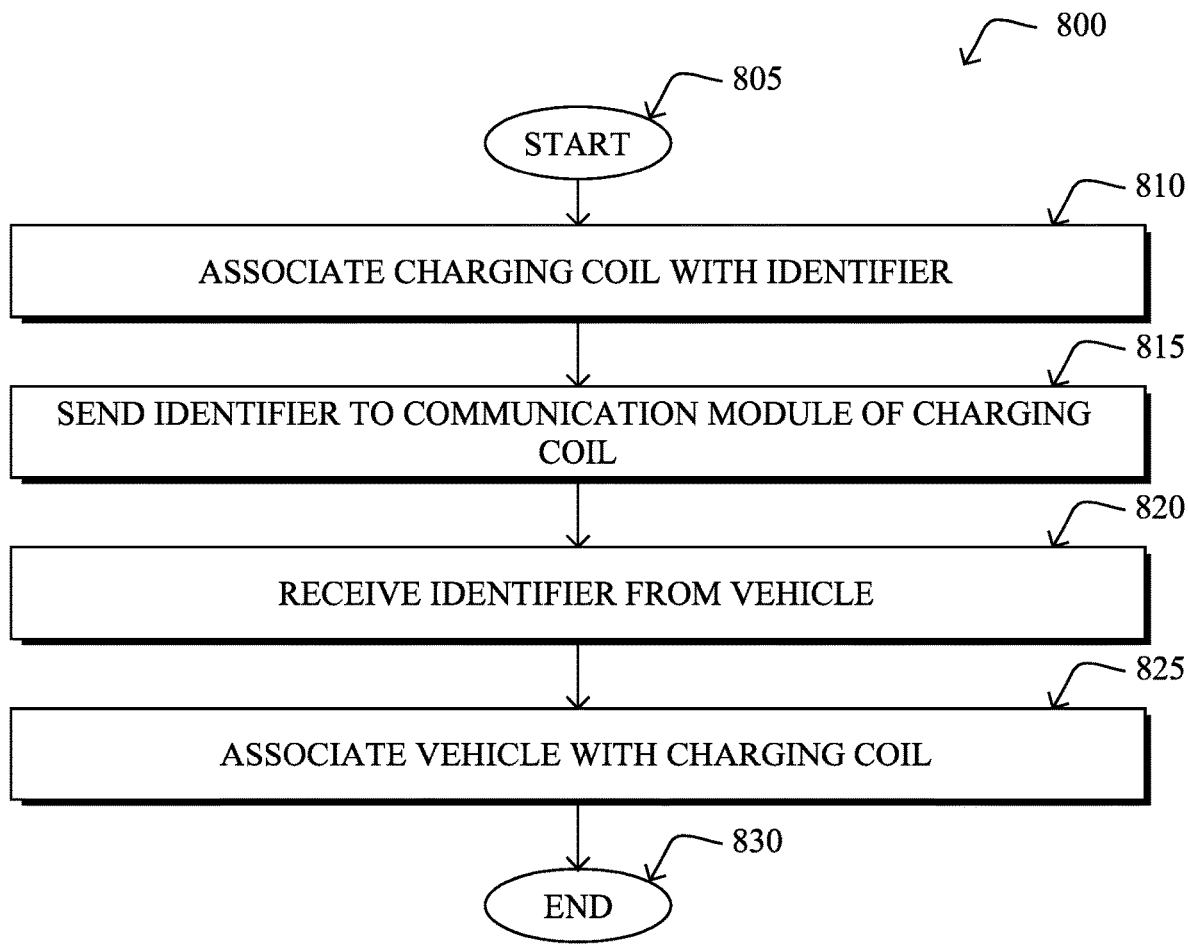
FIG. 8 illustrates an example simplified procedure for associating a vehicle with a charging coil.

FIG. 8 illustrates an example simplified procedure for associating a vehicle with a charging coil, in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device may associate a charging coil with a coil identifier. In various cases, the device may control any number of a plurality of charging coils and, if so, may assign unique identifiers to each of these coils.

At step 815, as detailed above, the device may send the coil identifier to a communication module of the charging coil. In turn, communication module of the charging coil forwards the coil identifier to an electric vehicle located above the charging coil. In various embodiments, the communication module of the charging coil may send the coil identifier to the vehicle as a powerline communication (PLC) message via the charging coil of the vehicle, as a visible or IR message to a corresponding module on the vehicle, or as an ultrasonic message to a receiver on the vehicle.

At step 820, the device may receive the coil identifier from the electric vehicle, as described in greater detail above. For example, once the communication module of the vehicle (e.g., a proximity communication module or PLC module) receives the coil identifier, it may send the identifier on to an OBU of the vehicle. In turn, the OBU may return the coil identifier back to the device, such as via a wireless message.

At step 825, as detailed above, the device may associate the electric vehicle with the charging coil. In particular, by receiving the coil identifier for the charging coil back from the vehicle, this allows the device to determine that the vehicle is located above the charging coil. In various embodiments, the device may leverage this information, along with a profile identifier from the vehicle, to aid in the selection of a profile and charging parameters to be used during charging. Such a profile may, for example, be used to correctly bill the appropriate account for charging of the vehicle by the charging coil. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a more accurate association of ground-based charging coils to vehicles than existing approaches. By doing so, this can help to ensure that the correct account is billed for the vehicle charging.

While there have been shown and described illustrative embodiments that provide for associating WPT charging coils with vehicles, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  associating, by a roadside unit (RSU), a charging coil with a coil identifier;
  sending, by the RSU, the coil identifier to a communication module of the charging coil, wherein the communication module of the charging coil forwards the coil identifier to an electric vehicle located above the charging coil;

receiving, at the RSU, the coil identifier from the electric vehicle;

generating, by the RSU, an association between the electric vehicle and the charging coil based on the received coil identifier; and predicting, by the RSU and using a machine learning-based model, a second association between the electric vehicle and a second charging coil based on movement of the electric vehicle.

2. The method as in claim 1, wherein the communication module of the charging coil forwards the identifier to the electric vehicle via a charging coil of the vehicle as a powerline communication (PLC) message.

3. The method as in claim 1, wherein the communication module of the charging coil forwards the identifier to a communication module of the vehicle as a visible light or infrared (IR) message.

4. The method as in claim 1, wherein the communication module of the charging coil forwards the identifier to a communication module of the vehicle as an ultrasonic message.

5. The method as in claim 1, further comprising:

receiving, at the RSU, a profile identifier from the electric vehicle; and controlling, by the RSU, the charging coil associated with the electric vehicle to provide charge to the electric vehicle based on the profile identifier.

6. The method as in claim 5, further comprising:

using the profile identifier to select coil charging parameters for the electric vehicle, wherein the RSU controls the charging coil according to the selected coil charging parameters.

7. The method as in claim 1, wherein the charging coil is embedded into a parking lot or drive-thru.

8. The method as in claim 1, wherein the charging coil is one of a plurality of charging coils controlled by the RSU, each charging coil in the plurality having its own communication module.

9. The method as in claim 1, wherein the RSU receives the coil identifier from the electric vehicle wirelessly.

10. A tangible, non-transitory, computer-readable medium storing program instructions that cause a roadside unit (RSU) to execute a process comprising:

associating, by the RSU, a charging coil with a coil identifier;

sending, by the RSU, the coil identifier to a communication module of the charging coil, wherein the communication module of the charging coil forwards the coil identifier to an electric vehicle located above the charging coil;

receiving, at the RSU, the coil identifier from the electric vehicle;

generating, by the RSU, an association between the electric vehicle and the charging coil based on the received coil identifier; and predicting, by the RSU and using a machine learning-based model, a second association between the electric vehicle and a second charging coil based on movement of the electric vehicle.

* * * * *

UNITED STATES PATENT AND TRADEMARK OFFICE
CERTIFICATE OF CORRECTION

| | |
|---|---|
| PATENT NO. | : 11,214,163 B2 |
| APPLICATION NO. | : 16/208751 |
| DATED | : January 4, 2022 |
| INVENTOR(S) | : Ashok Krishnaji Moghe |

It is certified that error appears in the above-identified patent and that said Letters Patent is hereby corrected as shown below:

In the Specification

Column 7, Line 57, please amend as shown:
which of ground-based charging coils 164 are to be Signed and Sealed this
Twenty-sixth Day of April, 2022

*Katherine Kelly Vidal*

Katherine Kelly Vidal
*Director of the United States Patent and Trademark Office*